July 30, 1935.   C. A. SABBAH   2,009,788

ELECTRIC POWER CONVERTING APPARATUS

Filed Aug. 27, 1930

Inventor:
Camil A. Sabbah,
by Charles E. Tullar
His Attorney.

Patented July 30, 1935

2,009,788

UNITED STATES PATENT OFFICE 2,009,788

ELECTRIC POWER CONVERTING APPARATUS

Camil A. Sabbah, Schenectady, N. Y., assignor to General Electric Company, a corporation of New York Application August 27, 1930, Serial No. 478,168

6 Claims. (Cl. 175—363)

My invention relates to electric power converting apparatus, and more particularly to such converting apparatus for transmitting power from a direct current system to an alternating current system by the use of electric valves.

There are in use at present two circuit arrangements for converting energy from direct current to alternating current by the use of electric valves. These are the so-called parallel type and series type inverters. For most applications the parallel type of inverter is decidedly preferable among other reasons because of the low potential drop of its electric valves, the low current rating of these valves, the efficient use of circuit elements, and because of the fact that the cathodes of both valves operate at the same potential, which may conveniently be at ground potential. In the type of parallel inverter heretofore used there has been one marked disadvantage in that its load characteristic was such that it would take on load to the breakdown point, that is, the load would rise to such a value that the electric valve could not longer commutate the load current with the result that the direct current would be short circuited through one of the valves. On the other hand, the series type inverter has a load-voltage characteristic which drops to zero before the load rises to a value sufficient to short circuit the direct current source.

It is an object of my invention to overcome this disadvantage of the parallel type inverter and to give it a load voltage characteristic which approximates that of the series type inverter for heavy loads and at the same time retains the other advantages of the parallel type inverter.

Another object of my invention is to modify the circuit of the parallel type inverter so that the load resistance may be reduced to zero without short circuiting the direct current source.

Other and further objects of my invention together with a more complete understanding thereof may be had from the following description taken in connection with the accompanying drawing, and its scope will be pointed out in the appended claims.

Figure 1:
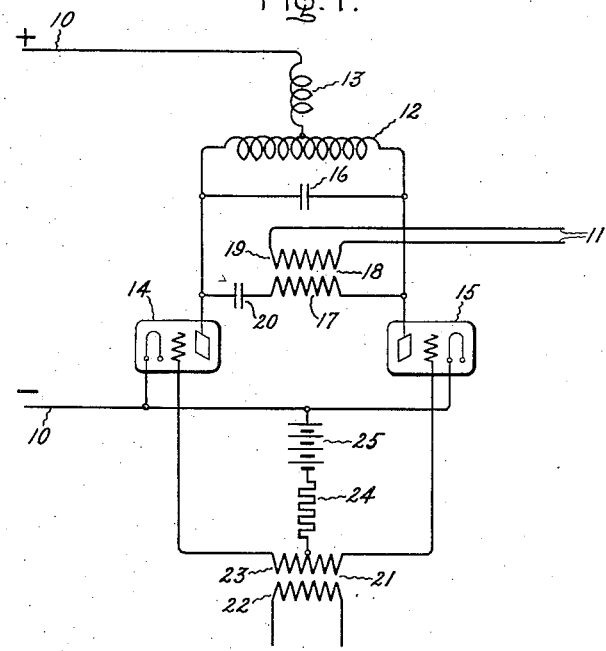
Figure 2:
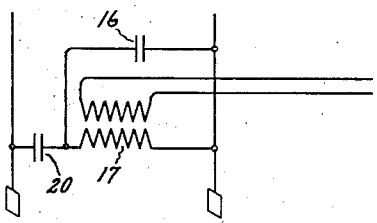

Fig. 1 of the drawing illustrates my invention as applied to a parallel inverter, and Fig. 2 shows a modification thereof.

In carrying my invention into effect I make use of the well known parallel type inverter comprising two electric valves in parallel, connected across the source of direct current through an inductive winding such as a reactor or transformer provided with an electrical mid-point tap which is connected to one of the direct current terminals. The circuit is provided with the usual commutating capacitor connected across the reactor terminals and with a grid control circuit, as will be well understood by those skilled in the art. A load circuit is connected across the terminals of the reactor or transformer. According to my invention I place a capacitor in series with the load circuit or so associated with the load circuit by electrical or inductive connections as to present a series capacitance to the load current.

Referring now to the drawing, I have shown a parallel type inverter comprising electric valves 14 and 15, each provided with an anode, a cathode and a control grid. The electric valves 14 and 15 may be of any of the several types well known in the art, but I prefer to use vapor electric discharge devices in which the starting of the current through the device is dependent upon the potential of the control grid but in which the current in the device may be interrupted only by reducing the anode potential below its critical value.

The anodes of the electric valves 14 and 15 are connected to opposite terminals of an inductive winding illustrated as a reactor 12, the electrical mid-point of which is connected to the positive direct current terminal 10 through a smoothing reactor 13. The cathodes of the valves 14 and 15 are connected together and to the negative direct current terminal 19. A capacitor 16 is connected across the terminals of the reactor 12 to commutate the current between the valves 14 and 15. The control circuit for the grids of the valves 14 and 15 is shown as including the secondary winding 23 of a transformer 21, the primary winding 22 of which is energized with an alternating potential of any desired frequency. The mid-point of the secondary winding 23 is connected to the cathode circuit of the valves 14 and 15 through a current limiting resistor 24 and a negative bias battery 25, as is well understood by those skilled in the art.

I have illustrated the alternating current load circuit 11 as being connected to the secondary winding 19 of a transformer 18, the primary winding 17 of which is connected in series with a capacitor 20, across the terminals of the reactor 12. However, it will be clear to those skilled in the art that the transformer 18 may be omitted if desired, and the load circuit connected in place of the primary winding 17, or that the reactor 12 may be replaced by the primary winding of a transformer, the secondary of which supplies the load circuit 11 through a series capacitor without departing from my invention in its broader aspects.

In explaining the operation of the above described arrangement, it will be assumed that the polarity of the potential applied to the grid of the electric valve 14 is such as to render it conducting. Current will then flow from the positive direct current terminal 10 through the left-hand portion of reactor 12 and through the valve 14 to the negative direct current line. As the current builds up in the left-hand of the reactor this reactor acts as an auto-transformer, a still higher positive voltage being induced in the right hand portion of the reactor. The capacitor 16 is thus charged to twice the potential of the direct current circuit. As soon as the grid potential changes polarity so as to render the valve 15 conducting, the full potential of the capacitor 16 is impressed between the anode and cathode of the valve 14 through the valve 15. As stated above this potential is approximately twice that of the direct current circuit and much greater than the potential drop across the conducting valve 14. Since this potential of the capacitor 16 is opposed to the potential impressed on the valve 14 from the direct current supply, it immediately neutralizes the impressed potential and interrupts the flow of current in the valve 14. Before the capacitor 16 is completely discharged, the grid of the valve 14 becomes negative and prevents the restarting of current in this valve. When the grid potential of the respective valves again reverses polarity, the current is transferred from the valve 15 to the valve 14 in the same manner, and this cycle is repeated indefinitely. It will be seen that in successive half-cycles the current flows in opposite directions in the reactor 12 so that an alternating potential appears at its terminals. The primary winding 17 of the load transformer 18 is connected in series with the capacitor 20 across the terminals of the reactor 12 with the result that an alternating potential is applied to the primary winding 17 and an alternating current delivered to the load circuit 11.

It has been found that the addition of a capacitor 20 decidedly improves the load-voltage characteristic of the circuit at heavy loads. This improvement of the voltage regulation may be attributed to the fact that the capacitor 20 cooperates with the capacitor 16 to produce additional commutation voltage at the heavy load.

The capacitor 20 constitutes a series impedance which is small in value with respect to the value of the load impedance of light loads but which may be comparable to the value of the load impedance of heavy loads when the load impedance is a small value. If such is the case, as the load increases an increasingly larger proportion of the inductive reactance of the load circuit is neutralized by the capacitor 20 with a corresponding decrease in the effective impedance of the load circuit. At the same time that the load increases an increasingly smaller proportion of the inductive reactance of the load circuit is being neutralized by the capacitor 16 because this capacitor is effectively in parallel with the load; and an increasingly larger proportion of the inductive reactance of the load circuit is being neutralized by the capacitor 20 because this capacitor is effectively in series with the load. Thus the proportions of the capacitors 16 and 20 are such that the resultant equivalent circuit of the elements 16, 17 and 20 has a capacitive reactance at all loads. However, as the reactance of the load circuit still further decreases the reactance of the capacitor 20 will become the limiting value of the impedance of the load circuit and capacitor 20. The capacitor 20 produces an effect which also aids in commutating the current from the valve 14 to the valve 15 by providing an additional reverse potential across the electric valve 14, thus allowing a longer time for its deionization. This commutating effect prevents an actual short circuit on the inverter and the maximum load is limited to a safe value.

Due to this cooperation between the two types of commutation provided by the capacitors 16 and 20, an increased effective voltage is obtained upon the load circuit at the heavier load which would not be possible in the parallel type inverter. On the other hand, an increased effective voltage is obtained on the load circuit at light load which would not be possible if a series type inverter were utilized. Thus, the resultant load voltage characteristic of the circuit is improved at both the high and low load ranges thereby extending the operating range and preventing an actual short circuit on the inverter. However, I do not wish to be confined to these probable explanations for the improvement in the load voltage characteristic of the circuit by the use of the capacitor 20, for an understanding of such underlying principles is not necessary to the practicing of my invention.

In Fig. 2 I have shown a modification of my invention in which the commutating capacitor 16 is connected across the primary winding 17 of the load transformer rather than across the terminals of the reactor 12. With this arrangement the capacitor 16 may be designed for slightly lower voltage. The operation is the same as that described in connection with Fig. 1.

While I have shown and described what I at present consider the preferred embodiments of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. In a system for converting direct current energy into periodically varying current, the combination of a pair of direct current supply terminals, an inductive winding having an intermediate point connected to one of said direct current terminals, a pair of similarly disposed electric valves connected between opposite terminals of said inductive winding and the other direct current terminal, means for alternately rendering said valves conductive, capacitive commutating means connected between corresponding electrodes of said valves, and a load subject to variation and a capacitor in series therewith connected between corresponding electrodes of said valves, said capacitor operating in response to increasing load to aid said commutating means.

2. In a system for converting direct current energy into periodically varying current, the combination of a pair of direct current supply terminals, an inductive winding having an intermediate point connected to one direct current terminal, a pair of similarly disposed electric valves connected between opposite terminals of said inductive winding and the other direct current terminal, means for alternately rendering said valves conductive, capacitive commutating means connected between corresponding electrodes of said valves, and a load having an impedance subject to variations and a capacitor in series therewith connected between corresponding electrodes of said valve, said capacitor operating in response to decreasing load impedance to improve the load voltage characteristics of said system.

3. In a system for converting direct current energy into periodically varying current, the combination of a pair of direct current supply terminals, an inductive winding having an intermediate point connected to one of said direct current terminals, a pair of similarly disposed electric valves connected between opposite terminals of said inductive winding and the other direct current terminal, means for alternately rendering said valves conductive, capacitive commutating means connected between corresponding electrodes of said valves, a load having an impedance subject to variations, and a capacitor arranged to be effectively in series with said load and operating in response to decreasing load impedance to aid said commutating means.

4. In a system for converting direct current energy into periodically varying current, the combination of a pair of direct current supply terminals, an inductive winding an intermediate point of which is connected to one direct current terminal, a pair of similarly disposed electric valves connected respectively between opposite terminals of said inductive winding and the other direct current terminal, means for alternately rendering said valves conducting, a commutating capacitor connected between corresponding electrodes of said valves, a capacitor, and an inductive load circuit subject to variable load conditions, said load circuit and said second capacitor being serially connected across said inductive winding thereby to increase the commutation voltage at heavy load.

5. In a system for converting direct current energy into periodically varying current, the combination of a pair of direct current supply terminals, a reactor comprising a winding an intermediate point of which is connected to one direct current terminal, a pair of similarly disposed electric valves connected respectively between opposite terminals of said reactor and the other direct current terminal, means for alternately rendering said valves conducting, an inductive load circuit subject to variable load conditions, a capacitor, said load circuit and said capacitor being serially connected across said reactor, and a commutating capacitor connected across said load circuit, said commutating capacitor cooperating to provide a commutating voltage equal to the voltage existing between corresponding electrodes of said valve thereby to improve the load voltage characteristics of said system.

6. In a system for converting direct current energy into periodically varying current, the combination of a direct current supply circuit, an inductive load circuit subject to variable load conditions, an inductive winding, a plurality of similarly disposed electric valves interconnecting said circuits through said inductive winding, means for alternately rendering said valves conducting, commutating capacitance means connected between corresponding electrodes of said valves, and capacitance means serially associated with the load circuit to increase the commutation voltage thereby to improve the load voltage characteristics of the system at the increasing load.

CAMIL A. SABBAH.